United States Patent [19]
Falk

[11] 3,919,082
[45] Nov. 11, 1975

[54] ELUTION APPARATUS AND METHOD

[75] Inventor: Heinz Falk, Augst, Switzerland

[73] Assignee: Sandoz Ltd., Basel, Switzerland

[22] Filed: Mar. 7, 1974

[21] Appl. No.: 449,013

Related U.S. Application Data

[63] Continuation of Ser. No. 251,929, May 10, 1972, abandoned.

[30] Foreign Application Priority Data

May 13, 1971 Switzerland ............ 7080/71

[52] U.S. Cl. .................. 210/31 C; 210/198 C
[51] Int. Cl.² .............................. B01D 15/08
[58] Field of Search ........ 210/198 C, 31 C; 55/67, 55/197, 386

[56] References Cited

UNITED STATES PATENTS

| 3,477,950 | 11/1969 | Clement et al. | 210/198 C X |
| 3,503,712 | 3/1970 | Sussman | 210/198 C |

*Primary Examiner*—John Adee
*Attorney, Agent, or Firm*—Gerald D. Sharkin; Robert S. Honor; Walter F. Jewell

[57] ABSTRACT

The invention concerns an elution apparatus and method. The elution apparatus disclosed is suitable for eluting a chromatographically isolated substance directly from the absorption layer of a thin layer chromatographic plate.

5 Claims, 3 Drawing Figures

ELUTION APPARATUS AND METHOD

This is a continuation of application Ser. No. 251,929, filed May 10, 1972, now abandoned.

This invention relates to an elution apparatus and method. More particularly, the invention relates to an apparatus and method which may be employed in thin layer chromatogram evaluation.

Evaluation of the substances in the absorption layer on a chromatographic plate, particularly quantitative evaluation, has in the past essentially involved procedures in which either the area of absorption layer carrying the particular chromatographically isolated substance is scraped off, or the density of the substance in said area is determined. The present invention does not involve either of said procedures, but provides an apparatus and method whereby the chromatographically isolated substance may be eluted directly from the absorption layer.

In accordance with the invention, there is provided an elution apparatus for eluting a chromatographically isolated substance from the absorption layer of a thin layer chromatographic plate, which comprises an elution head having a base section, a seal to seal between the base section and a surface of the chromatographic plate cleared of absorption layer around the isolated substance and to thus define an elution chamber, an eluent inlet conduit leading into the elution chamber, an eluate outlet conduit leading from the elution chamber, connection means for connecting up the inlet and outlet conduits respectively to an eluent supply line and eluate take off line, and holding means for holding the elution head in position on the chromatographic plate.

The base section preferably has a flat bottom surface, and the seal may be provided by a sealing skirt about the base section standing proud of said bottom surface to the extent of only slightly greater than the thickness of the absorption layer from which the isolated substance is to be eluted. An elution head having these features will thus define an elution chamber with the chromatographic plate which will be substantially filled by absorption layer carrying the isolated substance.

So that flow of eluent will take place through the entire volume of the absorption layer carrying the isolated substance, it is preferable that the eluent inlet conduit leads into the elution chamber at a position adjacent the sealing skirt to one side of the elution chamber and that the eluate outlet conduit leads from the elution chamber at a position adjacent the sealing skirt to the opposing side of the elution chamber.

The connection means for connecting up the inlet and outlet conduits respectively to an eluent supply line and eluate take off line may comprise threaded bores communicating with the inlet and outlet conduits to receive correspondingly threaded hollow screws provided at the connection ends of the eluent supply and eluate take off lines.

The holding means for holding the elution head in position on the chromatographic plate may comprise a table to support the thin layer chromatographic plate, and clamp means associated with the table to clamp the elution head in position on the chromatographic plate. The clamp means itself may comprise a lever arm pivotally mounted to the table, one free end of the lever arm to one side of the pivot being for engagement with the elution head and the other free end of the lever arm to the other side of the pivot having adjustment means associated with the table to adjust the clamping action of the lever arm on the elution head.

In assembled condition, it is preferable that the eluent inlet conduit open into the elution chamber at a level lower than the opening to the eluate outlet conduit so that eluent flows from the lower level through the absorption layer and out from the elution chamber through the eluate conduit at the higher level. The table is accordingly preferably tiltable between a horizontal position and an inclined position substantially parallel to an eluent supply line and eluate take off line leading downwardly via the inlet and outlet conduits to an eluate collection point.

Further, in accordance with the invention, there is provided a method of eluting a chromatographically isolated substance from the absorption layer of a thin layer chromatographic plate, which comprises sealing off the area of the absorption layer carrying the isolated substance, and eluting in situ the substance from the absorption layer.

The invention will now be described with reference to the accompanying drawings showing, by way of examples only, an elution apparatus in accordance with the invention.

Figure 1:
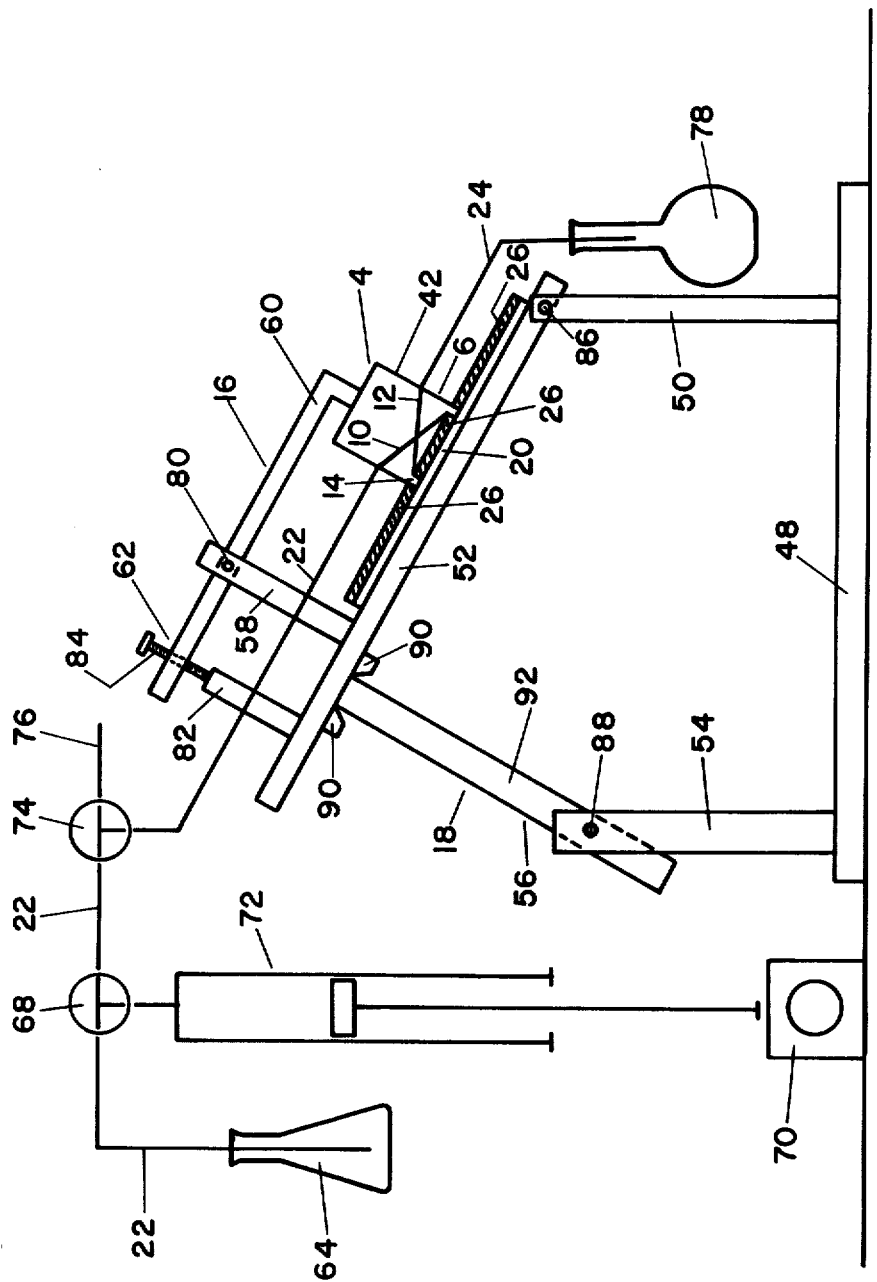
FIG. 1 is a schematic side view of an assembled elution apparatus.
Figure 2:
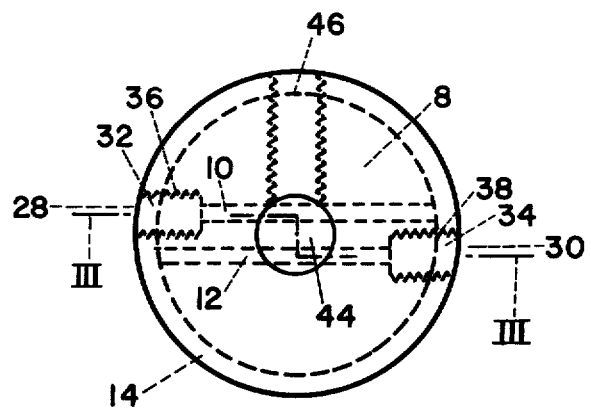
FIG. 2 is a plan view of an elution head of the apparatus.
Figure 3:
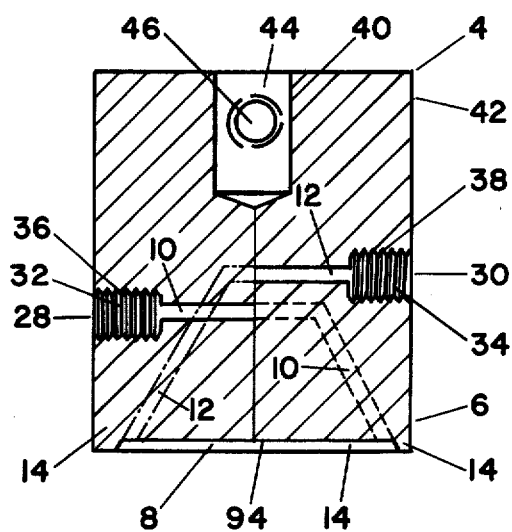
FIG. 3 is a cross-section taken at centrally displaced line III—III of FIG. 2.

Referring particularly to FIG. 1 of the drawings, the elution apparatus comprises an elution head 4 having a base section 6, a sealing skirt 14 about the base section standing proud of its bottom surface 94 (see FIG. 3) to seal against a surface of a chromatographic plate 20 cleared of absorption layer 26 around the isolated substance and to thus define an elution chamber 8 (see FIGS. 2 and 3). An eluent inlet conduit 10 leads into the elution chamber, an eluate outlet conduit 12 leads from the elution chamber Connection means 28 and 30 (see FIGS. 2 and 3) are provided for connecting up the inlet and outlet conduits respectively to an eluent supply line 22 and eluate take off line 24. Holding means 16 holds the elution head 4 in position on the chromatographic plate 20.

As can best be seen from FIG. 3, the bottom surfaces 94 of the base section 6 is flat, and the eluent inlet conduit leads into the elution chamber 8 at a position adjacent the sealing skirt 14 to one side of the elution chamber and the eluate outlet conduit leads from the elution chamber at a position adjacent the sealing skirt to the opposing side of the elution chamber.

Referring now particularly to FIGS. 2 and 3 of the drawings, the connection means 28 and 30 respectively comprise bores 32 and 34 having threads 36 and 38, communicating with the inlet and outlet conduits 10 and 12 to receive correspondingly threaded hollow screws (not shown) provided at the connection ends of the eluent supply and eluate take off lines (22, 24).

Referring again to FIG. 1 of the drawings, the holding means 16 for holding the elution head 4 in position on the chromatographic plate 20 comprises a table 52 to support the chromatographic plate and clamp means comprising a lever arm 60 pivotally mounted about pivot 80 via upright 58 fixed to the table 52. One free end of the lever arm 60 to one side of the pivot 80 engages with the elution head 4 and the other free end of the lever arm to the other side of the pivot 80 has adjustment means 62 associated with the table 52 comprising an upstanding leg 82 and screw 84 passing through mating threads in the lever arm 62 and seating on the leg 82. The clamping action of the lever arm 60 on the elution head 4 can be adjusted by means of the screw. The upper section 42 of the elution head 4 is provided with fixing means 40 for fixing one end of the lever arm 60 to the elution head. The fixing means comprises a bore 44 into which the end of the lever arm is receivable, and a threaded bore 46 for receiving a grub screw (not shown) for abutting against the section of the lever arm within the bore 44 and to thus fix onto the lever arm.

The table 52 is carried on a stand 18 and is tiltable between a horizontal position and an inclined position. The stand comprises a base plate 48, two pairs of stanchions 50 and 54 and support means 56 comprising a swing arm 92 pivotable about pivot 88. The swing arm is provided with extension shoulders 90 at its free end to provide a greater surface against which the underside of the table 52 may be rested when in the inclined position shown in FIG. 1. The table 52 is tiltable about pivot 86 at the top end of the pair of stanchionss 50. The height of the pair of stanchions 54 above the base plate 48 is chosen so that the table 52 will assume a horizontal disposition when rested on the free ends of the pair of stanchions 54. Thus, the table 52 may be tilted into the inclined position shown in FIG. 1, which is substantially parallel to eluent supply line 22 and the eluate take off line 24 which leads to an eluate collection point 78. In this position the table is supported by the swing arm 92. In the horizontal position the table is supported by the pair of stanchions 54, in which position the swing arm 92 will have been swung out of the way about the pivot 88.

Reference numerals 68 and 74 refer to three-way cocks, and reference numeral 76 to an eluate outlet line. A motor 70 provides the drive to a pump mechanism 72 for pumping eluent along the eluent supply line from eluent supply 64.

In use, the position of a chromatographically isolated substance on a prepared chromatogram is established, the absorption layer 26 is cut away about the isolated substance, e.g. by means of the serrated end of an open ended tube (not shown), which cuts out a ring in the absorption layer into which the sealing skirt 14 of the elution head 4 is fitted. The elution head is then clamped into sealing engagement with the chromatographic plate 20 by means of the clamp means 16. This preparation stage is conveniently effected on the table 52, while in its horizontal disposition. The table 52 is then tilted upwardly about the pivot 86, the swing arm 92 is lifted into position against the underside of the table, and the eluent supply and eluate take off lines 22 and 24 are connected up to the eluent inlet and eluant outlet conduits respectively. The pump 72 is then put in operation, the three-way cocks 68 and 74 are adjusted so that eluent will be pumped along the eluent supply line 22, into the elution chamber 8 through the eluent inlet conduit and, after having passed upwardly through the absorption layer carrying the isolated substance, out through the eluate outlet conduit 12 and along the eluant take off line 24 into collection point 78.

It will be appreciated that an apparatus and method in accordance with the invention allows for collection of an isolated substance from a chromatogram, without the danger of losing amounts of the substance following on filtration which otherwise needs to be effected to separate the chromatographically isolated substance from the material of the absorption layer.

What we claim is:

1. An elution apparatus for eluting a chromatographically isolated substance from the absorption layer of a thin layer chromatographic plate, which comprises an elution head having a base section which has a flat bottom surface, a sealing skirt about the base section standing proud of said bottom surface to the extent of only slightly greater than the thickness of the absorption layer to provide a seal between the base section and a surface of the chromatographic plate cleared of absorption layer around the isolated substance and to thus define an elution chamber, an eluent inlet conduit leading into the elution chamber at a position adjacent the sealing skirt to one side of the elution chamber, an eluate outlet conduit leading from the elution chamber at a position adjacent the sealing skirt to the opposing side of the elution chamber, connection means for connecting up the inlet and outlet conduits respectively to an eluent supply line and eluate take off line, a tiltable table to support the thin layer chromatographic plate, and clamp means associated with the table to clamp the elution head in position on the chromatographic plate.

2. An elution apparatus according to claim 1, in which the clamp means comprises a lever arm pivotally mounted to the table, one free end of the lever arm to one side of the pivot being for engagement with the elution head and the other free end of the lever arm to the other side of the pivot having adjustment means associated with the table to adjust the clamping action of the lever arm on the elution head.

3. An elution apparatus according to claim 1, in which the table is tiltable between a horizontal position and an inclined position substantially parallel to an eluent supply line and eluate take off line leading downwardly via the inlet and outlet conduits to an eluant collection point.

4. An elution apparatus according to claim 1, in which the connection means for connecting up the inlet and outlet conduits respectively to an eluent supply line and eluate take off line comprises threaded bores communicating with the inlet and outlet conduits to receive correspondingly threaded hollow screws provided at the connection ends of the eluent supply and eluate take off lines.

5. Method of eluting a chromatographically isolated substance in situ from the absorption layer of a thin layer chromatographic plate, which comprises clearing the surface of the chromatographic plate of absorption layer about the isolated substance, confining the absorption layer carrying said isolated substance in situ on the chromatographic plate in a volume which is substantially filled by the volume of the absorption layer carrying the isolated substance, and eluting the isolated substance from the enclosed absorption layer by passing eluent through said confined volume and collecting the eluate.

* * * * *